US007466841B2

(12) United States Patent
Bahlmann et al.

(10) Patent No.: US 7,466,841 B2
(45) Date of Patent: Dec. 16, 2008

(54) METHOD FOR TRAFFIC SIGN DETECTION

(75) Inventors: Claus Bahlmann, Princeton, NJ (US); Ying Zhu, Monmouth Junction, NJ (US); Visvanathan Ramesh, Plainsboro, NJ (US); Martin Pellkofer, Pentling (DE); Thorsten Köhler, Deuerling (DE)

(73) Assignee: Siemens Corporate Research, Inc., Princeton, NJ (US)

( * ) Notice: Subject to any disclaimer, the term of this patent is extended or adjusted under 35 U.S.C. 154(b) by 834 days.

(21) Appl. No.: 11/109,106

(22) Filed: Apr. 19, 2005

(65) Prior Publication Data

US 2006/0034484 A1 Feb. 16, 2006

Related U.S. Application Data

(60) Provisional application No. 60/637,841, filed on Dec. 21, 2004, provisional application No. 60/601,788, filed on Aug. 16, 2004.

(51) Int. Cl.
G06K 9/00 (2006.01)
(52) U.S. Cl. .................... 382/103; 382/104; 382/156; 382/159; 382/165; 382/291; 700/48; 700/51; 706/20
(58) Field of Classification Search .......... 382/103, 382/104, 107, 156, 159, 165, 181, 291; 700/47, 700/48, 51; 706/20
See application file for complete search history.

(56) References Cited

U.S. PATENT DOCUMENTS 6,266,442 B1 * 7/2001 Laumeyer et al. .......... 382/190

| 7,072,494 B2 * | 7/2006 | Georgescu et al. ......... 382/103 |
| 7,092,548 B2 * | 8/2006 | Laumeyer et al. .......... 382/104 |
| 7,212,651 B2 * | 5/2007 | Viola et al. ................ 382/103 |
| 2001/0036293 A1 * | 11/2001 | Laumeyer et al. .......... 382/104 |
| 2004/0186816 A1 * | 9/2004 | Lienhart et al. ............... 706/20 |
| 2004/0234136 A1 * | 11/2004 | Zhu et al. ................... 382/224 |
| 2006/0034484 A1 * | 2/2006 | Bahlmann et al. .......... 382/103 |
| 2006/0165258 A1 * | 7/2006 | Avidan ....................... 382/103 |

(Continued)

FOREIGN PATENT DOCUMENTS

WO WO 00/30024 5/2000

OTHER PUBLICATIONS

Lindner F et al, "Robust Recognition of Traffic Signals", Intelligent Vehicles Symposium, 2004 IEEE Parma, Italy, Jun. 14-16, 2004, pp. 49-53.

(Continued)

Primary Examiner—Gregory M Desire

(57) ABSTRACT

A method for detecting and recognizing at least one traffic sign is disclosed. A video sequence having a plurality of image frames is received. One or more filters are used to measure features in at least one image frame indicative of an object of interest. The measured features are combined and aggregated into a score indicating possible presence of an object. The scores are fused over multiple image frames for a robust detection. If a score indicates possible presence of an object in an area of the image frame, the area is aligned with a model. A determination is then made as to whether the area indicates a traffic sign. If the area indicates a traffic sign, the area is classified into a particular type of traffic sign. The present invention is also directed to training a system to detect and recognize traffic signs.

28 Claims, 4 Drawing Sheets

U.S. PATENT DOCUMENTS

2006/0177099 A1* 8/2006 Zhu et al. .................... 382/104
2007/0183651 A1* 8/2007 Comaniciu et al. .......... 382/154
2008/0069400 A1* 3/2008 Zhu et al. .................... 382/103

OTHER PUBLICATIONS

Wender S et al, "A Cascade Detector Approach Applied to Vehicle Occupant Monitoring with an Omni-directional Camera", Intelligent Vehicles Symposium, 2004 IEEE, Jun. 14, 2004, pp. 345-350.

Jouny I et al, "M-ary Sequential Hypothesis Tests for Automatic Target Recognition", Apr. 1992, IEEE Transactions on Aerospace and Electronic Systems, IEEE Inc., New York, US, pp. 473-483.

International Search Report including Notification of Transmittal of the International Search Report, International Search Report, and Written Opinion of the International Searching Authority.

Barnes et al., "Real-time radial symmetry for speed sign detection", IEEE Intelligent Vehicles Symposium (IV), pp. 566-571, Parma, Italy, 2004.

de la Escalera et al., "Traffic sign recognition and analysis for intelligent vehicles", Image and Vision Computing, 21, pp. 247-258, 2003.

de la Escalera, "Road traffic sign detection and classification", IEEE Trans. Indust. Electronics, 44, pp. 848-859, 1997.

Fang et al., "Road-sign detection and tracking", IEEE Trans. Vehicular Technology, 52(5), pp. 1329-1341, Sep. 2003.

Miura et al., "An active vision system for real-time traffic sign recognition", Proc. IEEE Conf. on Intelligent Transportation Systems (ITS), pp. 52-57, Dearborn, MI, 2000.

Paclik et al., "Road sign classification using Laplace kernel classifier", Pattern Recognition Lett., 21(13-14), pp. 1165-1173, 2000.

Piccioli et al., "A robust method for road sign detection and recognition", Computer Vision—ECCV, pp. 495-500, Springer Verlag, 1994.

Schapire, "A brief introduction to boosting", Proc. Of the $16^{th}$ Int. Joint Conf. on Artificial Intelligence, 1999.

Torresen et al., "Efficient recognition of speed limit signs", Proc. IEEE Conf. on Intelligent Transportation Systems (ITS), Washington, DC, 2004.

Viola et al., "Robust real-time object detection", Technical Report CRL 2001/01, Cambridge Research Laboratory, 2001.

Xie et al., "Component fusion for face detection in the presence of heteroscedastic noise", $25^{th}$ Pattern Recognition Symposium of the Germany Association for Pattern Recognition (DAGM), Magdeburg, Germany, 2003, Springer Verlag.

Zadeh et al., "Localization and recognition of traffic signs for automated vehicle control systems", Proc. SPIE vol. 3207, Intelligent Transportation Systems, pp. 272-282, 1998.

Schapire et al., "Improved boosting algorithms using confidence-rated predictions", Machine Learning, 37(3), pp. 297-336, 1999.

* cited by examiner

METHOD FOR TRAFFIC SIGN DETECTION

CROSS REFERENCE TO RELATED APPLICATIONS

This application claims the benefit of U.S. Provisional Application Ser. No. 60/601,788, filed Aug. 16, 2004, and U.S. Provisional Application Ser. No. 60/637,841, filed Dec. 21, 2004, which are incorporated by reference in their entirety.

FIELD OF THE INVENTION

The present invention is directed to a method for traffic sign detection, and more particularly, to a system and method for traffic sign detection and recognition using grayscale or color, shape and motion information.

BACKGROUND OF THE INVENTION

In traffic environments, signs regulate traffic, warn the driver and command or prohibit certain actions. Real-time and robust automatic traffic sign recognition can support and disburden the driver, and thus, significantly increase driving safety and comfort. For instance, it can remind the driver of the current speed limit, prevent him from performing inappropriate actions such as entering a one-way street, passing another car in a no passing zone, unwanted speeding, etc. Further, it can be integrated into an adaptive cruise control (ACC) for less stressful driving. In a more global context, it can contribute to the scene understanding of traffic context (e.g., if the car is driving in a city or on a freeway).

Traffic sign recognition is premised on some basic assumptions and takes advantage of some beneficial characteristics of traffic signs. First, the design of traffic signs is unique, thus, object variations are small. Further, sign colors often contrast very well against the environment. Moreover, signs are rigidly positioned relative to the environment (contrary to vehicles), and are often set up in clear sight to the driver.

Nevertheless, a number of challenges remain for a successful recognition. First, weather and lighting conditions vary significantly in traffic environments, diminishing the advantage of the mentioned object uniqueness. Additionally, as the camera is moving, additional image distortions, such as, motion blur and abrupt contrast changes, occur frequently. Further, the sign installation and surface material can physically change over time, influenced by accidents and weather, hence resulting in rotated signs and degenerated colors. Finally, the constraints given by the area of application require inexpensive systems (i.e., low-quality sensor, slow hardware), high accuracy and real-time computation.

The vast majority of known techniques for traffic sign recognition utilize at least two steps, one aiming at detection, and the other one at classification, that is, the task of mapping the detected sign image into its semantic category. Regarding the detection problem, several approaches have been proposed. Some of these approaches rely on gray scale data. One such approach employs a template based technique in combination with a distance transform. Another approach utilizes a measure of radial symmetry and applies it as a pre-segmentation within the framework. Since radial symmetry corresponds to a simplified (i.e., fast) circular Hough transform, it is particularly applicable for detecting possible occurrences of circular signs. Hypothesis verification is integrated within the classification.

Some other techniques for traffic sign detection use color information. These techniques share a two step strategy. First, a pre-segmentation is employed by a thresholding operation on a color representation, such as Red Green Blue (RGB). Linear or non-linear transformations of the RGB representation have been used as well. Subsequently, a final detection decision is obtained from shape based features, applied only to the pre-segmented regions. Corner and edge features, genetic algorithms and template matching have been used.

The drawback of these sequential strategies is that regions that have been falsely rejected by the color segmentation cannot be recovered in further processing. Additionally, color segmentation requires the fixation of thresholds, mostly obtained from a time consuming and error prone manual tuning.

A joint treatment of color and shape approach has also been proposed. This approach computes a feature map of the entire image frame, based on color and gradient information, while incorporating a geometry model of signs. This approach also requires a manual threshold tuning and is computationally expensive.

For the classification task, most approaches utilize well known techniques, such as template matching, multi-layer perceptions, radial basis function networks, and Laplace kernel classifiers. A few approaches employ a temporal fusion of frame based detection to obtain a more robust overall detection. These approaches require some sort of tracking framework. There is a need for a method for detecting and recognizing traffic signs that use an integrated approach for color and shape modeling in general object detection, but which does not require manually tuning thresholds.

SUMMARY OF THE INVENTION

The present invention is directed to a method for detecting and recognizing at least one traffic sign. A video sequence comprised of a plurality of image frames is received. One or more filters are used to measure features in at least one image frame indicative of an object of interest. The measured features are combined and aggregated into a score indicating possible presence of an object. The scores are fused over multiple image frames for a robust detection. If a score indicates possible presence of an object in an area of the image frame, the area is aligned with a model. A determination is then made as to whether the area indicates a traffic sign. If the area indicates a traffic sign, the area is classified into a particular type of traffic sign. The present invention is also directed to training a system to detect and recognize traffic signs.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for detecting and recognizing traffic signs. FIG. I illustrates a block diagram of a system for implementing the present invention. A camera 102 is used to capture images of a road and its surroundings. The camera 102 is typically mounted on a vehicle and pointed in a direction to capture the traffic signs. As would be expected with a typical road image, the image includes background images, such as road, buildings, trees, and houses, and vehicles driving on the road. The images are communicated to a processor 104 which analyzes the image intensity and image motion to detect any change in scene dynamics.

A sign detection framework is implemented using AdaBoost training to combine filter based features. Detected objects are tracked within a temporal information propagation framework. Next, in order to obtain an accurate normalization, the detected signs are precisely aligned to up to pixel accuracy using a statistical modeling of the sign geometry. Finally, classification is performed based on Bayesian generative modeling, including a hypothesis fusion over multiple frames.

Once a traffic sign is detected, the sign is identified via an output device 106. The output device 106 provides an output signal which communicates to the user the presence of the traffic sign. The output signal may be an audible signal or other type of warning signal. The output device 106 may also include a display for viewing the detected signs. The display provides an iconic representation of the signs that have been detected and which are being tracked. These icons can be stored in database 108.

Figure 1:
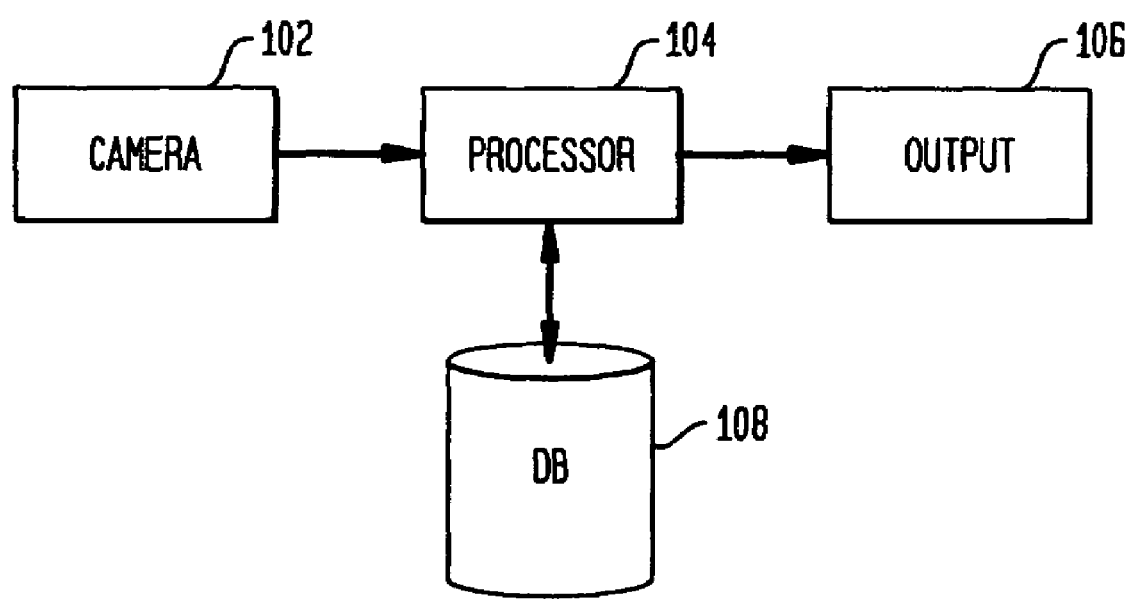
FIG. 1 is a system block diagram of a system for recognizing traffic signs in accordance with the present invention.
Figure 2:
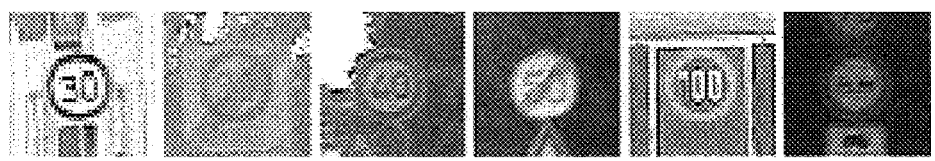
FIG. 2 is a series of images that exemplify examples of traffic signs that can be detected in accordance with the present invention.

The present invention provides a framework for a real-time robust traffic sign detection and recognition, which fuses hints from color, shape and motion. Such a system can be used, for example, for driver assistance in an intelligent automotive cockpit environment. FIG. 2 illustrates a series of image frames that exemplify traffic signs that can be detected using the method of the present invention. While the images are in black and white, the different gray scale intensities indicate the coloration of the signs which as indicated above differs significantly from the background color.

Figure 3:
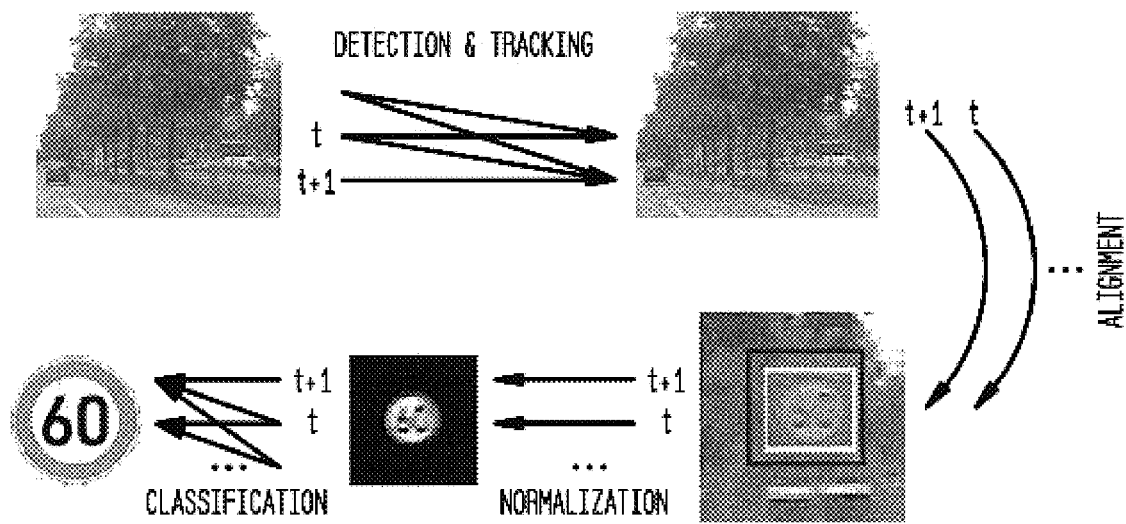
FIG. 3 is a diagram that illustrates a method for traffic sign recognition in accordance with the present invention.

The present invention is comprised of three main components. FIG. 3 illustrates an overview of the method of the present invention for detecting traffic signs. An initial image frame 302 is obtained of a street environment. The image frame 302 includes a view of the road as well as a view of the background. First, a sign detection framework is implemented using AdaBoost training to combine filter based features. Detected objects are tracked within a temporal information propagation framework. The present invention utilizes a filter design which is specially adapted to the shape of the sign to be detected. Color sensitive Haar wavelet features are used to detect appearances of signs at each frame t. For each subsequent image frame, such as frame 304, a determination is made as to whether an object (e.g., traffic sign) is detected. Once a sign is detected, it is tracked and individual detections from frames (t-$t_0$, ... t) are temporarily fused for a robust overall detection. Second, in order to obtain an accurate normalization, the detected signs are precisely aligned to up to pixel accuracy using a statistical modeling of the sign geometry. The sign is normalized with respect to position, scale and brightness. The resulting image is shown in frame 306 which isolates the potential object. Third, classification is performed based on a Bayesian generative modeling, including a hypothesis fusion over multiple frames. If the detected object is of interest the final object is shown such as illustrated by image 308.

The detection of objects, in this instance traffic signs, is addressed by a patch based approach. In detail, an image patch $x_i$ (taken as a vector) is assigned into one of the two classes "object" ($y_i \geq 0$) and "non-object" ($y_i < 0$) by evaluating an aggregation of simple features and simple classifiers $$y_i = \text{sign}\left(\sum_{t=1}^{T} \alpha_t \text{sign}(\langle f_t, x_i \rangle - \theta_t)\right), \tag{1}$$

The variables $f_t$ (taken as a vector) are filter masks, which describe an over-complete set of Haar wavelets. The over-complete set is generated by varying particular geometric parameters, such as position (a,b), width w, or height h. An optimal subset of those wavelets, as well as the weights $\alpha_t$ and classifier thresholds $\theta_t$ are obtained from the AdaBoost training algorithm.

The present invention employs a joint color and shape modeling approach within an AdaBoost training framework as is described in further detail hereinafter. For the application of traffic sign recognition, color represents valuable information, as most of the object color is not observed in typical background patterns (e.g., trees, houses, asphalt, etc.).

AdaBoost provides a simple but very effective leverage for the integration of color, when it is interpreted as a feature selection. In prior approaches, AdaBoost has been used to select (and weight) a set of wavelet features, parameterized by their geometric properties, such as, position (a,b), width w, or height h. Those wavelets have been typically applied to patches of gray-scale images. In situations where color instead of gray-scale information is available, the prior art provides no general guidance for choosing which color representation should be used, or how they could be optimally combined within a linear or nonlinear color transformation.

In accordance with the present invention, the color representation is regarded as being operated on as a free wavelet parameter, side by side to a, b, w, and h, thereby achieving a fully automatic color selection within the Adaboost framework. The varieties of the color representations to be integrated are not limited to R, G, and B. Prior domain knowledge can be incorporated by adopting linear or nonlinear color transformations. One beneficial property of this modeling is that these transformations are only "proposals" to the AdaBoost training.

In principle, each combination in color and geometric space can be proposed. The AdaBoost framework is designed to select the most effective and disregard ineffective ones. The variety of the "proposals" is solely limited by the computational and memory resources. In accordance with the present invention, nine color representations are employed as follows:

1). the plain channels R, G, and B,
2) the normalized channels r=R/S, g=G/S, and b=B/S with S=R+G+B,
3) the gray scale channel S/3, and
4) two linear transformations $T_1(R, G, B)$ and $T_2(R, G, B)$. Here $T_i$ corresponds to the first principle component of a linear discriminant analysis (LDA, also known as Fisher Discriminant Analysis) in the three dimensional RGB space. Data therein is represented by two classes; class 1 comprises typical objects and class 2 comprises background pixels. In this respect, $T_i$ is the optimal linear transformation for the discrimination of objects and background pixels. $T_1$ is evaluated for signs, where large red areas are present (corresponding to the "beginning of" signs), $T_2$ for the signs which are dominated by gray colors (corresponding to the "suspension of" signs).

It is to be understood by those skilled in the art that other combinations or types of color representations can be used without departing from the scope and spirit of the present invention.

Figure 4:
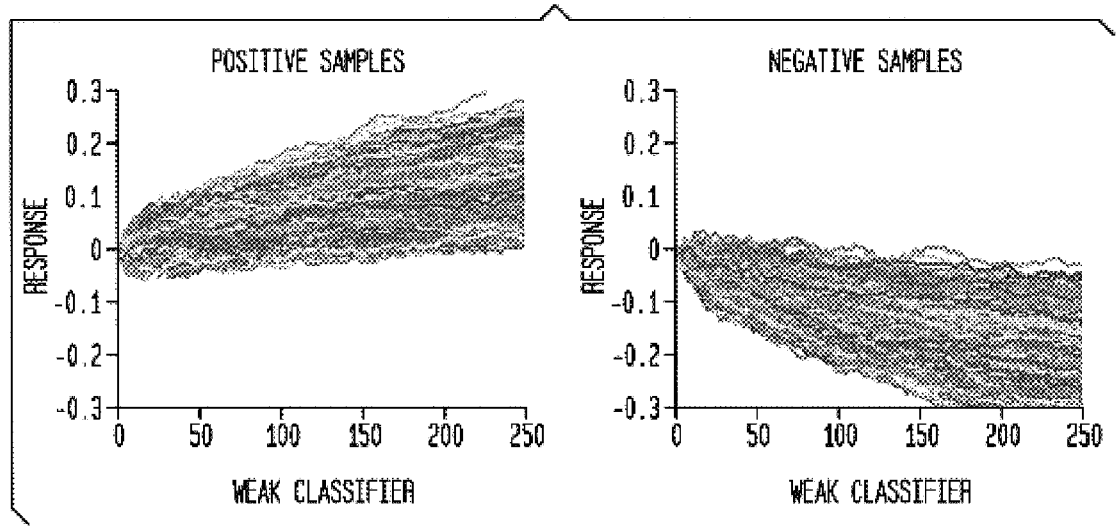
FIG. 4 illustrates graphs of partial responses negative and positive examples as a function of a weak classifier in accordance with the present invention.

A result of the AdaBoost training for the traffic signs is illustrated in FIG. 4 which illustrates the first six wavelets selected by AdaBoost for the sign detection. For each of the six Haar wavelets, the pixels below the white areas are weighted by +1, the black area by −1. The wavelets are parameterized by their width w, the height h, and relative coordinates a and b. The background "coloring", shown in different gray levels, indicates the color channel the individual features are computed on. For the present example, the color channels correspond to r, R, G, r, S/3, g.

For purposes of describing the present invention, it is assumed that the method is being used to locate circular signs which have a red ring around their perimeter. However, it is to be understood by those skilled in the art that the color representations and wavelet features can be modified accordingly to detect signs having different characteristics without departing from the scope and spirit of the present invention. When the wavelets are used for sign detection, the most valuable information is selected from the color representations. In the instance of the present example, r, R and G, corresponds to the frequently observed red ring in the positive and trees in the negative sample set. This underlines the usefulness of color in the present invention.

Because the patch based detection is not scale invariant, different detectors are trained for a number of discrete scales. After detection, an estimate of detected sign parameters (i.e., position $(a_0, b_0)$ and scale $r_0$) can be obtained from the maxima in the response map of respective detectors.

Once detected, a sign is tracked using a simple motion model and temporal information propagation. For a more robust detection, the results of the individual frame based detections are fused to a combined score.

Figure 5:
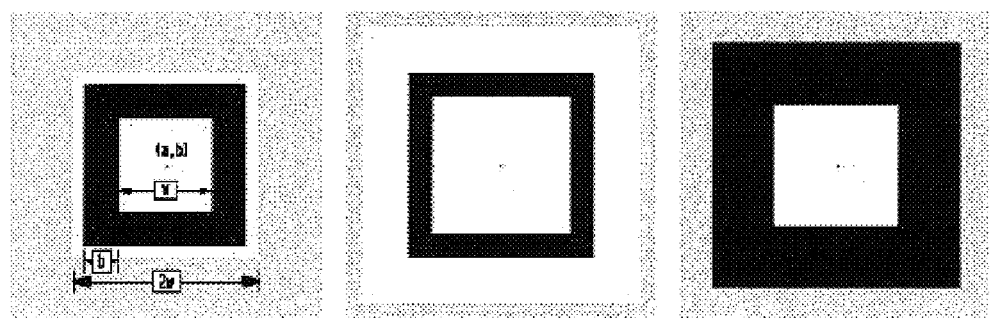
FIG. 5 illustrates an example of a ring shaped filter in accordance with the present invention.
Figure 6:
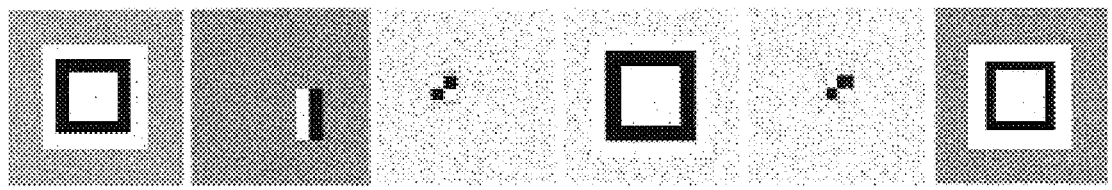
FIG. 6 illustrates the first six Haar wavelets selected by an AdaBoost algorithm, including ring filter wavelets in accordance with the present invention.

In accordance with another aspect of the present invention, a new type of filter feature for the detection of ring-type objects is employed. This new filter feature approximates a ring structure by utilizing a combination of three rectangular areas of different size and identical center. A geometric illustration of the ring feature is shown in FIG. 5. As shown, the white areas correspond to the positive pixels which are weighted with +1 by the filter. The black areas correspond to the negative pixels and are weighted with −1 by the filter. The gray area denotes background, which corresponds to a weight of 0. Note that this type of modeling presumes that the signs are aligned in the center of the image patch.

In order to keep the total amount of variations for AdaBoost traceable, the number of free parameters has been kept as small as possible. The ring feature can be parameterized by the height h (which is the same as the width) of the inner rectangle and bandwidth b. Height and width of the outer rectangle is 2h. Proper registration of the objects (e.g., signs) corresponding to the small centered dots 502, 504, 506 keep the ring centered.

Another aspect of this invention concerns the efficient evaluation of the "strong classifier" as defined in Equation (1). In the general context of the here employed patch based object detection philosophy, the following two observations hold:

1). The vast majority (in practice, more than 99.99%) of the observed test patches $x_i$ are non-objects, that is, they result in a negative $y_i$.
2). The majority of those non-objects are "clear" negatives in the sense that an accurate estimate of $y_i$ can be formed from only the first few summands in Equation (1).

An empirical examination of the second observation is illustrated in FIG. 4. It shows the partial responses $$r_i^{(t)} = \sum_{t'=1}^{t} a'_{t'} \operatorname{sign}(\langle f'_{t'}, x_i \rangle - \theta'_{t'}) \quad (2)$$

of 500 positive (FIG. 4(a)) and 500 negative (FIG. 4(b)) training examples $x_i$ as a function of the weak classifier index t. From FIG. 4(b) it can be taken that the majority of negative examples already have a comparably large negative value (here, ≈−0.05−−0.15) after approximately 10-50 weak classifier evaluations. Positive examples always lead to values $r_i^{(t)} > -0.05$ within the same interval of weak classifier evaluations.

In this respect, a significant computational cost decrease is possible by making early decisions about $y_i$, when appropriate. This very general problem of validating a model based on sequentially arriving data has been studied in literature under the name sequential hypothesis testing.

This concept shall be applied to the strong classifier computation as follows. Given a set of thresholds $\emptyset=(\emptyset_1, \ldots, \emptyset_T)$, the partial classifier decisions are defined as $$y_i^{(t)} = \operatorname{sign}(r_i^{(t)} - \emptyset_t). \quad (3)$$

and devise a candidate pruning strategy as explained in the following. At each step $t \in \{1, \ldots, T-1\}, y_i^{(t)}$ is compared to zero. If $y_i^{(t)} \geq 0$, the summation will be continued. If $y_i^{(t)} < 0$, the summation is terminated and $x_i$ is classified as a negative pattern.

The trade-off between efficiency and accuracy can be controlled by the thresholds $\emptyset_t$. The larger $\emptyset_t$, the less candidates are pruned at step t. The following two situations describe the extreme cases:

1). If $\emptyset_t = \sum_{t'=1}^{t} a_{t'}, t \in \{1, \ldots, T-1\}, y_i^{(t)} \geq 0$ will always hold. Hence, the summation will never be terminated prior to t=T, and the result will be equivalent to the naïve evaluation of Equation (1).
2). If $\emptyset_t = -\sum_{t'=1}^{t} a_{t'} - \epsilon$ with $\epsilon > 0$ any small number, then $y_i^{(t)} < 0$, and the iteration will terminate immediately, classifying $x_i$ as a negative sample. In the practice, however, $\emptyset_t$ will most often be chosen positive.

The thresholds ∅ can be adapted from the given data. One reasonable strategy is to adjust the set of $\emptyset_t$ during (or posterior to) the AdaBoost training such that a certain false negative rate $1-d_t$ is met for the training (or for a disjoint evaluation) dataset at step t, that is, $$1 - d_t \leq 1 - \bar{d}_t, \forall t \in \{1, \ldots T-1\}. \quad (4)$$

For the special case of a zero target false negative rate, $1-d_t=0, \forall t \in \{1, \ldots T-1\}$, this is equivalent to $$\emptyset_t = r_{min,pos}^{(t)}, t \in \{1, \ldots, T-1\}, \quad (5)$$

where $r_{min,pos}^{(t)} = \min_{i \in pos}\{r_i^{(t)}\}$ is the minimum response in the positive training (or evaluation) set at step t. In the context of FIG. 4(a), $r_{min,pos}^{(t)}$ corresponds to the lower boundary of all $\{r_i^{(t)}\}$.

Using the above described strategy for the current application of traffic sign detection, it was possible to prune 94% of 250 weak classifier evaluations for negative $x_i$ in average. Due to the small fraction of positive $x_i$ (cf. observation 1 above), this corresponds to roughly the same percentage within the entire ensemble of candidates.

In accordance with the present invention, sequential testing, known as cascading is used to identify strong classifiers. An evaluation of a cascade (i.e., a degenerated decision tree) of detectors with increasing complexity (each of which is implemented by a boosted strong classifier in virtue of Equation (1)). In this cascade, early (and less complex) nodes aim at the massive rejection of clear negative examples, whereas later (and more complex) nodes are specialized for the accurate discrimination between the difficult negative and positive samples.

This sequential testing approach provides the following advantages. Early decisions are made for clear negative candidates. Sequential testing evaluates one single strong classifier decision, the goal of which is to minimize one particularly defined error rate. In addition, the sequential testing re-uses responses from previous nodes without extra computation. The sequential testing method also prunes candidates after each weak classifier evaluation.

The present invention is based on the detection of accurately aligned objects (e.g., signs). The detection based on the filter features provides a coarse estimate of the sign position and scale since it detects patches on predefined, discrete scales. The following describes a method for aligning a detected object in accordance with the present invention. In the example being described, all signs to be detected have a circular shape. Hence their location and size can be represented by the parameters (a, b, r) where (a, b) denotes the center position and r denotes the radius of the sign.

The present invention uses a Hough transform and edge images that have been augmented with additional statistical information about the sign geometry. Most of the signs to be detected are silhouetted from the background by their circular overall shape, but also distinguished by intrinsic homogeneous regions of, for instance, the surrounding ring or the interior pictographic region.

Figure 7:
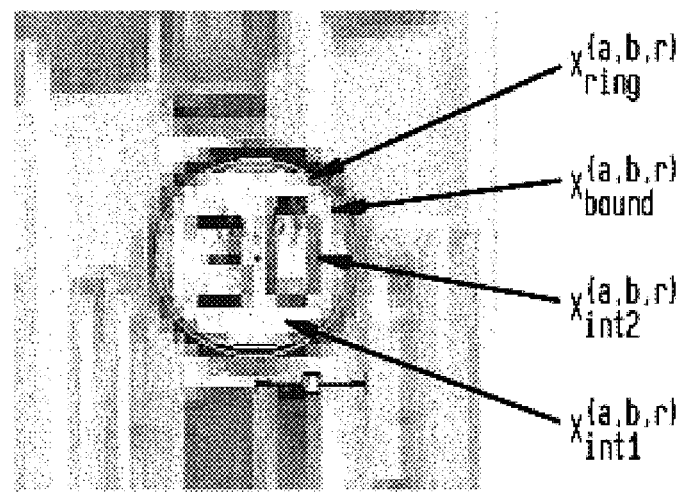
FIG. 7 illustrates the three defined regions for a sign in accordance with the present invention.

Given the object parameters (a, b, r), four regions in the image $X_{Edge}^{(a,b,r)}$, $X_{Boundary}^{(a,b,r)}$, $X_{Ring}^{(a,b,r)}$, $X_{Pict}^{(a,b,r)}$ are defined as illustrated in FIG. 7 and as follows:

$$X_{Edge}^{(a,b,r)} = \left\{(x,y) \,\Big|\, r - \frac{1}{2} \leq \|(x,y)^T - (a,b)^T\| < r + \frac{1}{2}\right\} \quad (6)$$

$$X_{Boundary}^{(a,b,r)} = \left\{(x,y) \,\Big|\, \frac{3}{4}r - \frac{1}{2} \leq \|(x,y)^T - (a,b)^T\| < \frac{3}{4}r + \frac{1}{2}\right\} \quad (7)$$

$$X_{Ring}^{(a,b,r)} = \left\{(x,y) \,\Big|\, \frac{3}{4}r < \|(x,y)^T - (a,b)^T\| \leq r\right\} \quad (8)$$

$$X_{Pict}^{(a,b,r)} = \left\{(x,y) \,\Big|\, \|(x,y)^T - (a,b)^T\| \leq \frac{3}{4}r\right\}. \quad (9)$$

The quantity $$\frac{3}{4}r$$

corresponds to the radius of the inner circle for all "beginning of" signs.

For a true sign object with parameters (a, b, r) it is expected that
1) $X_{Boundary}^{(a,b,r)}$ to have high values in the component of the gradient vector, pointing towards $(a,b)^T$.
2) $X_{Edge}^{(a,b,r)}$ to have high values in the component of the gradient vector, pointing towards $(a,b)^T$.
3) $X_{Ring}^{(a,b,r)}$ to have one narrow peak in a unimodal color distribution.
4) $X_{Pict}^{(a,b,r)}$ to have two narrow peaks in a bimodal color distribution, partitioning $X_{Pict}^{(a,b,r)}$ into two modes of a background region $X_{PictBG}^{(a,b,r)}$ and a foreground (text) region $X_{PictFG}^{(a,b,r)}$ with $X_{Pict}^{(a,b,r)} = X_{PictBG}^{(a,b,r)} \cup X_{PictFG}^{(a,b,r)}$, and
5) the distribution of $X_{Ring}^{(a,b,r)}$ to significantly differ from the interior background mode $X_{PictBG}^{(a,b,r)}$.

Based on these deliberations, an energy function is defined.

$$\begin{aligned} E(a,b,r) &= \sum_{i=1}^{6} \alpha_i E_i(a,b,r) \\ &= \alpha_1 grad_{X_{Edge}^{(a,b,r)}} + \alpha_2 grad_{X_{Boundary}^{(a,b,r)}} + \\ &\quad \alpha_3 \log(\sigma^2_{X_{Ring}^{(a,b,r)}}) + \alpha_4 \log(\sigma^2_{X_{PictBG}^{(a,b,r)}}) + \\ &\quad \alpha_5 \log(\sigma^2_{X_{PictFG}^{(a,b,r)}}) + \alpha_6 \frac{(\mu_{X_{Ring}^{(a,b,r)}} - \mu_{X_{PictBG}^{(a,b,r)}})^2}{\sigma^2_{X_{Ring}^{(a,b,r)}} + \sigma^2_{X_{PictBG}^{(a,b,r)}}}, \end{aligned} \quad (10)$$

which should be minimal for the true sign parameters, that is, $$(a_0, b_0, r_0) = \underset{(a,b,r)}{\operatorname{argmin}}\{E(a,b,r)\}. \quad (11)$$

In Equation (10), $\alpha_1, \ldots, \alpha_6$ are weights, which are to be adjusted. In the present invention, this problem is solved with help of a gradient descent in the six dimensional $\alpha$ space with respect to the classification error. The uncovering of the two modes in $X_{Pict}^{(a,b,r)}$ can be solved by standard techniques (e.g., mean shift, EM).

Based on the estimated sign parameters $(a_0, b_0, r_0)$, the following normalization steps are pursued:
1) A circular region, corresponding to the sign area with parameters (a,b,r) is extracted.
2) The image brightness is normalized within this region by histogram equalization.
3) The resulting image is bi-linearly scaled to the classifier resolution.

Next, classification of the object is performed. The classification framework is based on the generative paradigm, employing unimodal Gaussian probability densities. Prior to the probabilistic modeling, a feature transformation is performed using standard linear discrimination analysis (LDA). In this respect a feature vector $\chi \in R^{25}$ of the sign pattern comprises the first 25 principle components of the LDA.

For each class l, a probability density function p(x|l) is estimated based on a unimodal multivariate Gaussian $$p(x|l) = N_{\mu_x^{(l)}, \Sigma_x^{(l)}}(x), \quad (12)$$

thus the entire classifier is determined by 23 (equivalent to the number of different sign classes) pairs of mean and covariance ($\mu_x^{(l)}, \Sigma_x^{(l)}$).

Given a feature vector $x^{(t)}$ from the test sequence at frame t, a maximum likelihood (ML) approach implies a classification decision $\hat{l}$ which is defined by $$\hat{l} = \underset{l}{\operatorname{argmin}} \left\{ d\left(x^{(t)}, \left(\mu_x^{(l)}, \sum_x^{(l)}\right)\right) \right\} \quad (13)$$

and $$d\left(x^{(t)}, \left(\mu_x^{(l)}, \sum_x^{(l)}\right)\right) = -\ln(p(x^{(t)}|l)) \quad (14)$$

The classification performance can be improved by taking into account temporal dependencies. Given a feature sequence $X^{(t_O)} = [x^{(l)}, \ldots, x^{(t_O)}]$ as a result from the tracking, the classifier decision can be combined from the observations so far seen. Assuming the statistical independence of $x^{(l)}, \ldots, x^{(t_O)}$, a combined distance is given by $$d\left(X^{(t_o)}, \left(\mu_x^{(l)}, \sum_x^{(l)}\right)\right) = -\ln\left(\prod_{t=1}^{t_o} p(x^{(t)}|l)\right) \quad (15)$$

$$= \sum_{t=1}^{t_o} d\left(x^{(t)}, \left(\mu_x^{(l)}, \sum_x^{(l)}\right)\right)$$

From a practical point of view, it can be worthwhile to weight the impact of the individual frames differently, i.e., $$d\left(X^{(t_o)}, \mu_x^{(l)}, \sum_x^{(l)}\right) = \sum_{t=1}^{t_o} \pi_t d\left(x^{(t)}, \mu_x^{(l)}, \sum_x^{(l)}\right). \quad (16)$$

An exemplary weight is $$\pi_t = a^{t_0 - t} \quad (17)$$

with a<1. This value is chosen because as the traffic signs get bigger in later frames, it results in a more accurate frame classification.

Probabilistic confidence measures for the classification are given by means of the posterior probability for each class l', $$p(l'|x^{(t)}) = \frac{p(x^{(t)}|l') P(l')}{\sum_l p(x^{(t)}|l) P(l)}. \quad (18)$$

thus it is straightforward to integrate information about sign priors into the approach, e.g., from the traffic environment (e.g., city or freeway).

The present invention is directed to a system and method for detecting, tracking and recognizing traffic signs. The system integrates color, shape and motion information. It is built on three components, that is, a detection and tracking framework based on AdaBoost and Haar wavelet features, an accurate alignment based on the statistical modeling of sign geometry, and a classifier based on Gaussian distributions.

Having described embodiments for a method for detecting traffic signs, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for detecting and recognizing at least one traffic sign, the method comprising the steps of:
    a. receiving a video sequence comprised of a plurality of image frames;
    b. using one or more filters to measure features in at least one image frame indicative of an object of interest;
    c. aggregating and combining features into a score indicating possible presence of an object;
    d. fusing the scores over multiple image frames for a robust detection;
    e. if a score indicates possible presence of an object in an area of the image frame, aligning the area with a model;
    f. determining if the area indicates a traffic sign; and
    g. if so, classifying the area into a particular type of traffic sign.

2. The method of claim 1 wherein the image frames are color image frames.

3. The method of claim 2 wherein at least one filter is a color representation filter.

4. The method of claim 3 wherein the color filter incorporates one or more color channels.

5. The method of claim 4 wherein at least one color channel is a normalized color channel.

6. The method of claim 4 wherein at least one channel is a gray channel.

7. The method of claim 4 wherein at least one color channel is a linear transformation of a color channel.

8. The method of claim 1 wherein the image frames are grayscale image frames.

9. The method of claim 8 wherein at least one filter is a grayscale representation filter.

10. The method of claim 1 wherein at least one filter is a ring filter.

11. The method of claim 1 wherein the step of combining features into a score further comprises an aggregated evaluation of simple classifiers and wavelet features.

12. The method of claim 11 wherein the aggregated classifier is evaluated using a sequential hypothesis testing scheme and partial classifier decisions.

13. The method of claim 1 wherein the step of detecting traffic signs further comprises the steps of:
    accumulating scores for consecutive image frames to obtain a cumulative score;
    comparing the accumulated score after each image frame to determine if the score is above a predetermined threshold;
    if the score is above the threshold, adding a feature score from the next image frame to the accumulated score; and
    if the score is below the threshold, determining that the feature is not associated with an object of interest.

14. The method of claim 1 wherein the step of aligning the area of the image further comprises the steps of:
- defining an edge region, a boundary region, a ring region and an interior region;
- defining a cost function that measures dissimilarity of a sign model and a candidate sign image patch; and
- estimating correct sign parameters from a minimization of an error function in the parameter space.

15. The method of claim 14 wherein the step of estimating sign parameters is used for image normalization and further comprises the steps of:
- normalizing position and scale of the sign parameters, and normalizing image intensity, by using an area defined on x, y, and r, and statistical properties of the area.

16. The method of claim 14 wherein the estimated sign parameters are x, y, and r and are used to form an image region-of-interest (ROI).

17. The method of claim 16 wherein a classification feature vector is obtained from a linear discriminant analysis (LDA) of pixels in the ROI.

18. The method of claim 17 wherein a linear transformation is determined by linear discriminant analysis (LDA) of object and non-object pixels in the color space.

19. The method of claim 14 wherein adaptation of parameters $\alpha_i$ in $$E(a,b,r) = \sum_{i=1}^{6} \alpha_i E_i(a,b,r)$$
$$= \alpha_1 grad_{X_{Edge}^{(a,b,r)}} +$$
$$\alpha_2 grad_{X_{Boundary}^{(a,b,r)}} +$$
$$\alpha_3 \log\left(\sigma^2_{X_{Ring}^{(a,b,r)}}\right) +$$
$$\alpha_4 \log\left(\sigma^2_{X_{PictBG}^{(a,b,r)}}\right) +$$
$$\alpha_5 \log\left(\sigma^2_{X_{PictFG}^{(a,b,r)}}\right) +$$

-continued
$$\alpha_6 \frac{\left(\mu_{X_{Ring}^{(a,b,r)}} - \mu_{X_{PictBG}^{(a,b,r)}}\right)^2}{\sigma^2_{X_{Ring}^{(a,b,r)}} + \sigma^2_{X_{PictBG}^{(a,b,r)}}}$$

is performed by a gradient decent with respect to classification error.

20. The method of claim 1 wherein the classification of a sign image is obtained using multivariate Gaussian probability density functions of the feature space and a maximum-a-priori (MAP) or maximum likelihood (ML) approach.

21. The method of claim 20 wherein the step of classification further comprises the step of accumulating classification scores for consecutive image frames to obtain a cumulative classification score.

22. The method of claim 20 wherein training of sign classes involves an automatic alignment of the training images, an image normalization, a region-of-interest formation, a linear discriminant analysis (LDA) feature transform, and the estimation of Gaussian probability density functions.

23. The method of claim 1 wherein the traffic sign being detected is a circular sign having a colored ring around its perimeter.

24. The method of claim 1 wherein filters $f_t$, weights $\alpha_t$ and classifier thresholds $\theta_t$ are adapted using AdaBoost.

25. The method of claim 24 wherein thresholds $\theta_t$ for sequential hypothesis testing are determined from $$1-d_t \leq 1-\overline{d}_t, \forall t \in \{1, \ldots T-1\}.$$

with a target false negative rate $1-\overline{d}_t$.

26. The method of claim 24 wherein thresholds $\theta_t$ for sequential hypothesis testing are determined from $$\emptyset_t = r_{min,pos,}^{(t)}, t \in \{1, \ldots, T-1\}.$$

27. The method of claim 1 wherein geometric parameters of filters $f_t$ are adapted using AdaBoost.

28. The method of claim 1 wherein color representation of filters $f_t$ are adapted using AdaBoost.

* * * * *